(12) United States Patent
Tuwairgi

(10) Patent No.: US 9,205,514 B2
(45) Date of Patent: Dec. 8, 2015

(54) HIGH PRESSURE GREASE FITTING TOOL FOR ONLINE REPLACEMENT

(71) Applicant: Saudi Arabian Oil Company, Dhahran (SA)

(72) Inventor: Ibrahim M. Tuwairgi, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 244 days.

(21) Appl. No.: 14/068,156

(22) Filed: Oct. 31, 2013

(65) Prior Publication Data

US 2015/0113786 A1     Apr. 30, 2015

(51) Int. Cl.
| | |
|---|---|
| B23P 6/00 | (2006.01) |
| F16N 21/06 | (2006.01) |
| B25B 33/00 | (2006.01) |
| B23P 15/00 | (2006.01) |
| F16N 21/02 | (2006.01) |
| F16K 3/36 | (2006.01) |

(52) U.S. Cl.
CPC ............... *B23P 15/001* (2013.01); *B23P 6/00* (2013.01); *F16K 3/36* (2013.01); *F16N 21/02* (2013.01); *F16N 21/06* (2013.01); *B25B 33/00* (2013.01); *Y10T 29/53848* (2015.01); *Y10T 29/54* (2015.01)

(58) Field of Classification Search
CPC ....... B23P 6/00; B23P 15/001; B25B 27/023; B25B 27/28; B25B 21/002; B25B 33/00; B25B 23/10; F16N 21/06; F16N 21/02; Y10T 29/49819; Y10T 29/53687; Y10T 29/53709; Y10T 29/53848; Y10T 29/54

USPC ...................................................... 184/105.3
See application file for complete search history.

(56) References Cited

U.S. PATENT DOCUMENTS

| 2,540,679 A | 2/1951 | Laffaille |
| 4,040,265 A | 8/1977 | Hellerman et al. |
| 4,482,272 A | 11/1984 | Colin |
| 5,868,224 A | 2/1999 | DiCarlo |
| 2001/0027900 A1* | 10/2001 | Wilcox ............... F16C 33/6625 184/105.3 |
| 2010/0269933 A1 | 10/2010 | Haunhorst |

FOREIGN PATENT DOCUMENTS

| DE | 297 03 439 U1 | 4/1997 |
| DE | 20 2007 018 555 U1 | 10/2008 |
| WO | 2013059748 A1 | 4/2013 |

OTHER PUBLICATIONS

PCT International Search Report and the Written Opinion; dated Jan. 12, 2015; International Application No. PCT/US2014/062571; International File Date: Oct. 28, 2014.

* cited by examiner

*Primary Examiner* — Jermie Cozart
(74) *Attorney, Agent, or Firm* — Bracewell & Giuliani LLP; Constance Gall Rhebergen

(57) ABSTRACT

A grease fitting replacement tool includes a housing, a shaft, an adaptive socket, a loosening device, loosening device includes a packed coupling, a stem housing, and a stem drive system, the stem drive system includes a stem, a threaded mount, and an actuator, a main valve, a fall-out trap, a pressure port valve, a vent valve, a pressure gauge, and a temporary mounting system. A method of using a grease fitting replacement tool to replace a grease fitting of a piece of equipment while the piece of equipment remains in operation.

13 Claims, 5 Drawing Sheets

HIGH PRESSURE GREASE FITTING TOOL FOR ONLINE REPLACEMENT

FIELD OF THE INVENTION

This invention relates to an apparatus and method for replacement of grease fittings. More specifically, the present invention relates to an apparatus and method for removal and replacement of a grease fitting on a valve while the valve is in operation.

BACKGROUND OF THE INVENTION

Ball valves require lubricant or grease for operation. A grease fitting is installed in the outside of the valve and allows grease to be fed into and around the ball of the valve. A grease fitting has a small opening to a channel which connects to the ball and the valve seat, but the small opening and channel are typically closed to atmosphere with a small ball enclosed inside and lying flush with the small opening. To open the channel between the atmosphere and the valve internal components, the small ball must be moved out of the way; moving the ball requires pressure. Thus, typically the grease is injected through the grease fitting into the valve internals using a grease gun, which delivers the grease at a pressure sufficient to move the ball from the opening.

Grease fittings are prone to failure and must be replaced from time to time. Failures include leaking, seal damage which causes loss of pressure within the valve seat, construction problems, or the introduction of foreign debris. Replacement requires isolation of the valve, which potentially requires a shutdown of all or part of the process containing the valve resulting in lost production. The process of replacing the grease fitting contains hazards. Current practices to replace a grease fitting require the valve containing the grease fitting to be shut down, isolated, depressurized, and drained. The valve and the grease within can be under pressure. The depressurization process poses hazards to workers. Drainage can result in oil spills that cause environmental harm. The entire process can take time which results in additional lost production.

Therefore, a process by which grease fittings can be replaced without shutting down production and with minimal exposure risks would be beneficial.

SUMMARY OF THE INVENTION

This invention relates to an apparatus and method for replacement of grease fittings. More specifically, the present invention relates to an apparatus and method for removal and replacement of a grease fitting on a valve while the valve is in operation.

In one embodiment of the present invention, a grease fitting replacement tool is provided. The tool includes a housing having a housing longitudinal axis, a housing anchor end, a housing drive end, a top, and a bottom. The tool further includes a shaft, the shaft, at least partially enclosed within and extending from the housing drive end, includes a shaft body, a shaft first end, and a shaft second end. The shaft is configured to move along the housing longitudinal axis. The tool includes an adaptive socket, the adaptive socket includes a cupped end and a shaft end, where the shaft end is removably mounted on the shaft first end, where the cupped end is configured to grip a grease fitting. The tool further includes, a loosening device, the loosening device removably coupled to the housing drive end. The loosening device includes a packed coupling, the packed coupling connected to the housing drive end, the packed coupling configured to create a seal around the shaft body, a stem housing, the stem housing attached to the packed coupling, the stem housing is configured to guide a stem, the stem housing includes a longitudinal axis, and a stem drive system, the stem drive system mounted to the stem housing, the stem drive system includes the stem, the stem connected to the shaft second end and at least partially enclosed within and extending from the stem drive system. The stem is configured to move the shaft along the longitudinal axis of the stem housing. The stem drive system also includes a threaded mount, the threaded mount connected to the stem housing, the threaded mount is configured to pass the stem along the longitudinal axis of the stem housing, and an actuator, the actuator connected to the threaded mount, the actuator is configured to drive the stem along the longitudinal axis of the stem housing. The tool further includes a main valve positioned in the housing through which the shaft passes, the main valve configured to achieve a closed position, the closed position seals the housing anchor end from the housing drive end, a fall-out trap positioned in the housing between the main valve and the housing anchor end, the fall-out trap configured to hold the grease fitting clear of the housing longitudinal axis, a pressure port valve positioned in the housing configured to allow for pressurizing the housing anchor end to a predetermined housing pressure, a vent valve positioned in the housing between the main valve and the housing drive end, the vent valve is configured to relieve the pressure in the housing drive end when the main valve is in the closed position, and a pressure gauge, the pressure gauge is configured to display the predetermined housing pressure in the housing. The tool further includes a temporary mounting system. The temporary mounting system configured to temporarily secure the grease fitting replacement tool to a piece of equipment, such that the housing anchor end is flush with the piece of equipment.

In certain embodiments of the present invention, the temporary mounting system includes a top chain, the top chain includes a top anchor end and a top clasp end, the top anchor end is configured to secure the top chain to the top of the housing at the housing anchor end, the top anchor end includes a top anchor mount and a top anchor bolt, the top anchor bolt secures the top anchor mount to the top of the housing at the housing anchor end. The top clasp end is configured to secure the top clasp end of the top chain to a bottom clasp end of a bottom chain, the top clasp end includes a top clasp mount, a clasp bolt, and a top clasp nut, the clasp bolt fits through the top clasp mount and into a bottom clasp mount of the bottom chain, the top clasp nut and a bottom clasp nut can be tightened on the clasp bolt so that the top clasp mount and the bottom clasp mount are brought together. The temporary mounting system of the tool further includes the bottom chain, the bottom chain includes a bottom anchor end and the bottom clasp end, the bottom anchor end is configured to secure the bottom chain to the bottom of the housing anchor end, the bottom anchor end includes a bottom anchor mount and a bottom anchor bolt, the bottom anchor bolt secures the bottom anchor mount to the bottom of the housing anchor end. In certain embodiments of the grease fitting replacement tool, the stem housing further includes a plurality of position markers, the position markers configured to mark positions along the longitudinal axis of stem housing. In certain embodiments of the grease fitting replacement tool, the actuator is a wheel. In certain embodiments of the present invention, the actuator is a wheel. In certain embodiments of the present invention, the pressure gauge is positioned between the housing anchor end and the main valve. In certain embodiments of the present invention, the piece of equipment is a motor operated valve. In certain embodiments of the present invention, the fall-out trap is a valve configured to pass the grease fitting therethrough.

In a second aspect of the present invention, a method of using a grease fitting replacement tool to replace a grease fitting of a piece of equipment is provided. The method includes the steps of positioning a housing anchor end of a housing of the grease fitting replacement tool such that an adaptive socket within the housing aligns with the grease fitting of the piece of equipment. The housing includes a housing longitudinal axis, a housing anchor end, and a housing drive end. The adaptive socket is removably mounted to a shaft first end of a shaft, the shaft is configured to move along the housing longitudinal axis, the housing drive end is connected to a loosening device. The method further includes the step of securing the housing to the piece of equipment, where the housing is flush with the piece of equipment. The method further includes the step of retracting a stem to a retracted position, where an actuator retracts the stem connected to a shaft second end, the retracted position being where the adaptive socket removably mounted on the shaft first end is between a main valve and the housing drive end, the actuator is connected to a threaded mount, the threaded mount configured to pass the stem through the loosening device. The method further includes the steps of closing the main valve, the main valve being located in the housing, the main valve is configured to seal the housing anchor end from the housing drive end, closing a vent valve, the vent valve located in the housing between the main valve and the housing drive end, opening a pressure port valve, the pressure port valve is located in the housing between the housing anchor end and the main valve, the pressure port valve is configured to introduce a pressurizing medium to the housing to pressurize the housing anchor end to a predetermined housing pressure, opening the main valve, maintaining the pressure within the housing at the predetermined housing pressure. The method further includes the step of extending the stem to an extended position, where the actuator extends the stem, the extended position being where the adaptive socket is proximate to the housing anchor end between the housing anchor end and the main valve, gripping the grease fitting with the cupped end of the adaptive socket, removing the grease fitting from the piece of equipment, retracting the stem to the retracted position, closing the main valve, the step of closing the main valve occurs when the stem is in the retracted position, opening the vent valve to depressurize the housing drive end, disconnecting the loosening device from the housing, removing the grease fitting gripped by the adaptive socket, placing a new grease fitting in the adaptive socket, connecting the loosening device to the housing, closing the vent valve, opening the main valve, maintaining the pressure within the housing at the predetermined housing pressure, extending the stem to the extended position, installing the new grease fitting, closing the pressure port valve, opening the vent valve, and unsecuring the housing from the piece of equipment.

In certain embodiments, the step of securing the housing includes the steps of bolting a top chain to a top of the housing at housing anchor end, bolting a bottom chain to a bottom of the housing anchor end, wrapping the top chain around a top of the piece of equipment, wrapping the bottom chain around a bottom of the piece of equipment, and securing the bottom chain to the top chain with a clasp bolt, where the clasp bolt passes through a bottom clasp mount and a top clasp mount and is secured with a bottom clasp nut and a top clasp nut, the clasp bolt, the bottom clasp nut and the top clasp nut are configured to bring the top chain and the bottom chain together such that the housing anchor end is flush with the piece of equipment. In certain embodiments of the method, the method further includes the steps of marking the retracted position with a first position marker on the loosening device, and marking an extended position with a second position marker on the loosening device. In certain embodiments of the method, the step of closing the vent valve is performed prior to the step of securing the housing to a piece of equipment. In certain embodiments of the present invention, the housing further comprises a fall-out trap, the fall-out trap located on the bottom of the housing between the housing anchor end and the main valve. In certain embodiments of the method, the step of closing a fall-out trap is performed prior to the step of securing the housing to a piece of equipment.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Figure 1:
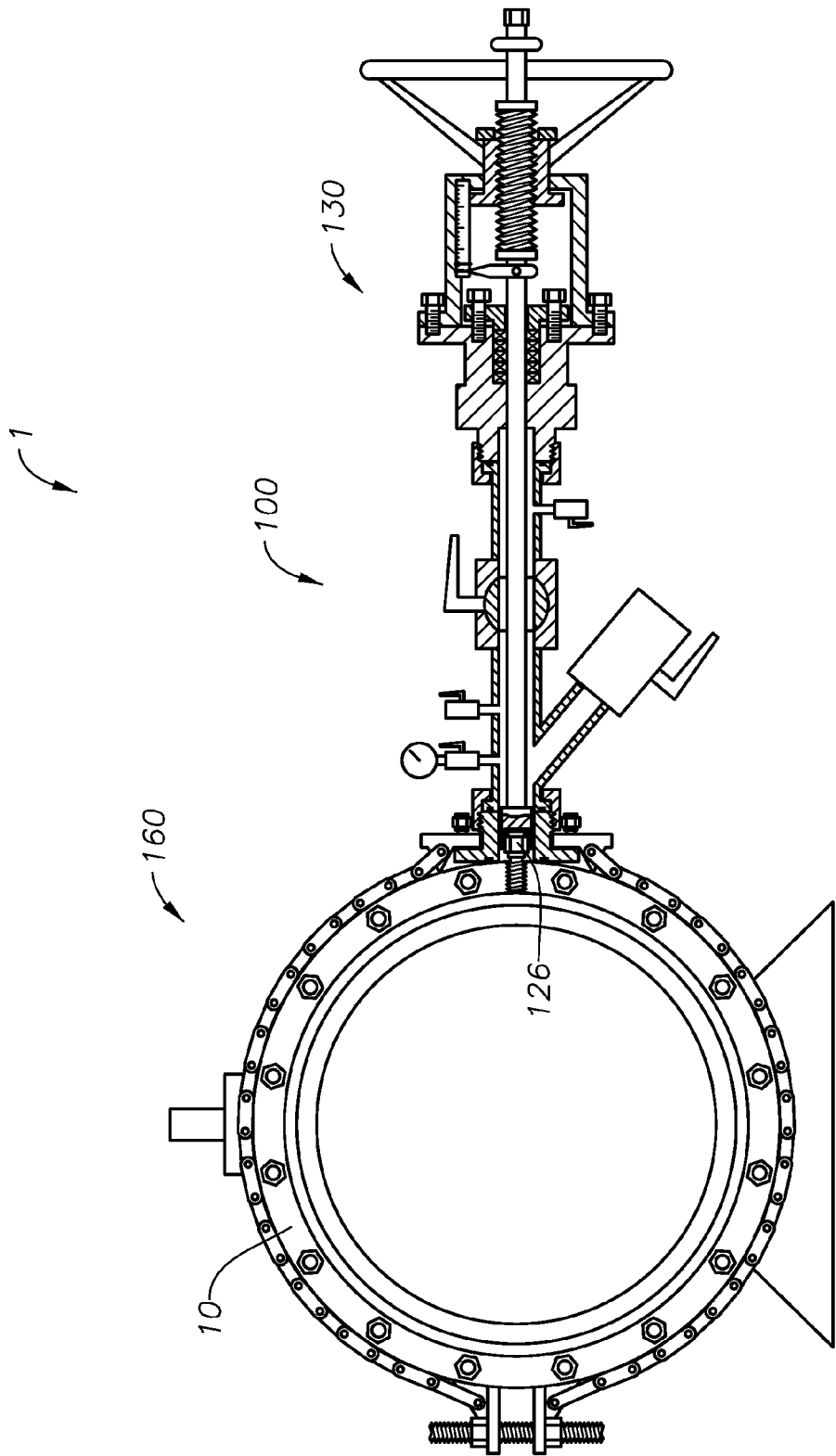
FIG. 1 is a plan view of grease fitting replacement tool 1.

FIG. 1 provides a plan view of grease fitting replacement tool 1, in accordance with an embodiment of the invention. Grease fitting replacement tool 1 includes housing 100, loosening device 130, and temporary mounting system 160. Grease fitting replacement tool 1 is configured to remove and replace grease fitting 126 from piece of equipment 10 while in operation. Piece of equipment 10 can be any type of equipment or process unit containing a grease fitting. In one embodiment of the present invention, piece of equipment 10 is a motor operated valve. In one embodiment of the present invention, grease fitting replacement tool 1 removes and reinstalls a high pressure grease fitting while a motor operated valve is in operation. In an alternate embodiment of the present invention, piece of equipment 10 is a ball valve. In at least one embodiment, the grease fitting replacement tool 1 can be used on piece of equipment 10 when piece of equipment 10 is not in operation.

Figure 2:
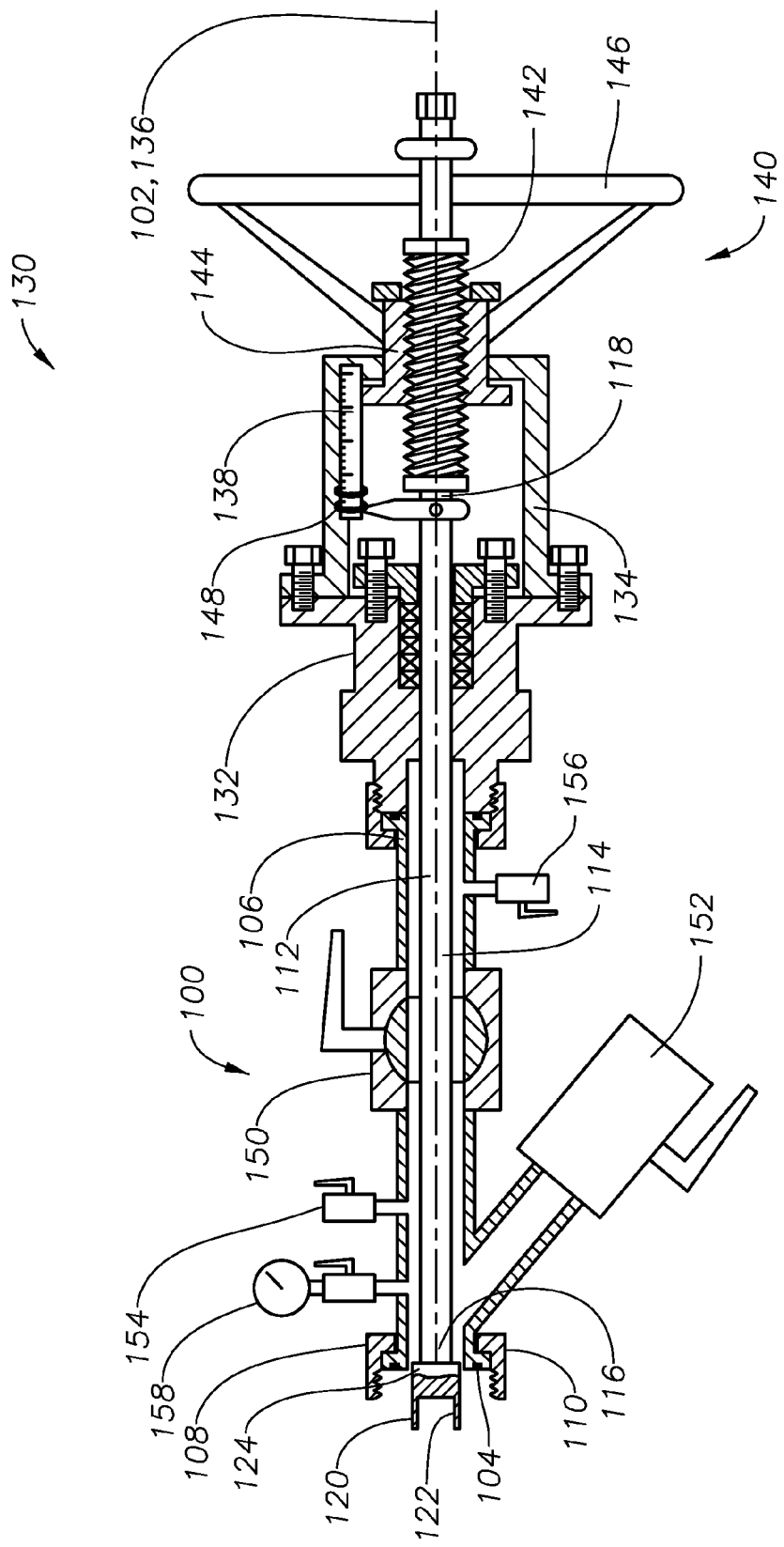
FIG. 2 is a plan view of the housing and the loosening device.

FIG. 2 provides a plan view of an embodiment of the present invention. Housing 100 is hollow. Housing 100 is substantially linear such that housing 100 has housing longitudinal axis 102. Housing longitudinal axis 102 extends in a substantially straight line from housing anchor end 104 to housing drive end 106 parallel between top 108 of housing 100 and bottom 110 of housing 100. With reference to FIG. 1, housing anchor end 104 lies flush against piece of equipment 10 so that grease fitting 126 lies within housing anchor end 104 of housing 100. In accordance with an embodiment of the present invention, housing 100 is a length of pipe of a standard pipe size. The inner dimensions of housing 100 can be any dimensions that allows shaft 112 to pass through. Housing 100 is any type of material that can withstand high pressures. In at least one embodiment of the present invention, piece of equipment 10 operates at a pressure of 1000 psi.

In accordance with an embodiment of the present invention, housing 100 includes fittings, such as main valve 150, fall-out trap 152, pressure port valve 154, vent valve 156, and pressure gauge 158. In accordance with an alternate embodiment of the present invention, housing 100 includes only fittings and does not include any pipe length.

Main valve 150 is located in housing 100 between housing anchor end 104 and housing drive end 106. Main valve 150 can be any type of valve capable of isolating housing anchor end 104 from housing drive end 106. Main valve 150 can be any size that allows shaft 112 to pass through without obstruction. Main valve 150 can be in any orientation on housing 100.

Fall-out trap 152 is located between housing anchor end 104 and main valve 150. Fall-out trap 152 is located on bottom 110 of housing 100. Fall-out trap 152 catches grease fitting 126 if grease fitting 126 falls out of adaptive socket 120 while proximate to housing anchor end 104. Fall-out trap 152 can be of any design and size that clears grease fitting 126 from housing longitudinal axis 102 during operation of grease fitting replacement tool 1. In some embodiments, fall-out trap 152 can be a chamber protruding from bottom 110 of housing 100. The chamber can be spherical, elliptical, square, or any shape that accommodates grease fitting 126. In at least one embodiment of the present invention, fall-out trap 152 is a valve. Fall-out trap 152 can be any type of valve such that grease fitting 126 passes through fall-out trap 152 when in an open position. In some embodiments of the present invention, grease fitting 126 remains in fall-out trap 152 until grease fitting replacement tool 1 is removed from piece of equipment 10. Then, fall-out trap 152 is cleared and grease fitting 126 passes through housing 100. In an alternate embodiment of the present invention, fall-out trap 152 is a valve connected to a port, where grease fitting 126 falls into fall-out trap 152, fall-out trap 152 is closed separating housing 100 from the port, then the port is removed and grease fitting 126 falls out.

Pressure port valve 154 is located between housing anchor end 104 and main valve 150. Pressure port valve 154 can be any type of fitting through which a pressurizing medium can be introduced to housing 100. In one embodiment of the present invention, pressure port valve 154 is a valve. In a preferred embodiment of the present invention, hydraulic oil is the pressurizing medium. In an alternate embodiment, air is the pressurizing medium. The pressurizing medium pressurizes housing 100 to a predetermined housing pressure. The predetermined housing pressure is the pressure which prevents grease from leaking out of the hole left when grease fitting 126 is removed from piece of equipment 10. The predetermined housing pressure can be the pressure of the process or the pressure at which piece of equipment 10 normally operates. In at least one embodiment of the present invention, the predetermined housing pressure is 450 psi. One of skill in the art will appreciate that the predetermined housing pressure is determined based on piece of equipment 10 and the pressure considerations of the system. Grease fitting replacement tool 1 is designed of materials to withstand the predetermined housing pressure. Pressure port valve 154 can be in any orientation on housing 100 that does not interfere with fall-out trap 152.

Vent valve 156 is located between main valve 150 and housing drive end 106. Vent valve 156 can be in any orientation on housing 100. In a preferred embodiment of the present invention, vent valve 156 is located on bottom 110 of housing 100. Vent valve 156 can be any type of valve capable of relieving the pressure from housing 100.

Pressure gauge 158 is located between housing anchor end 104 and main valve 150. Pressure gauge 158 can be any type of pressure gauge capable of providing a reading of the predetermined housing pressure in housing 100.

Housing 100 is designed to provide unobstructed passage of shaft 112 from housing anchor end 104 to housing drive end 106 along housing longitudinal axis 102. Shaft 112 is at least partially enclosed within housing 100 and extends from housing drive end 106. Shaft 112 includes shaft body 114, shaft first end 116, and shaft second end 118.

Adaptive socket 120 is removably mounted on shaft first end 116 at shaft end 124 of adaptive socket 120. Shaft first end 116 and shaft end 124 are joined by any means that provides a secure connection, but can be disassembled. In one embodiment of the present invention, adaptive socket 120 is a ball socket. In an alternate embodiment of the present invention, a variety of adaptive sockets 120 are available to be mounted on shaft first end 116. Different adaptive sockets 120 accommodate the different sizes or configurations of grease fitting 126. Adaptive socket 120 includes shaft end 124 and cupped end 122. Adaptive socket 120 can be made of any material that allows for connection to shaft 112 and allows for gripping grease fitting 126. Cupped end 122 can be any type of design that fits with grease fitting 126. Cupped end 122 can be any type of fitting that grips grease fitting 126, such that shaft 112 can disconnect grease fitting 126, but where grease fitting 126 will not fall out of cupped end 122. Cupped end 122 can be substantially circular, oval, hexagonal, square, or any other shape designed to accommodate grease fitting 126. Cupped end 122 can have a smooth interior surface or textured interior surface. Cupped end 122 can have straight interior sides, tapered interior sides, or concave interior sides. Cupped end 122 can have continuous sides, like a bowl shape, or can have prongs designed to grip grease fitting 126. Cupped end 122 can be designed with cutouts or grooves to allow cupped end 122 to grip grease fittings 126 with 45° or 90° angles. Cupped end 122 can be any diameter that grips grease fitting 122 while being capable of passing through shaft 112. Exemplary diameters of grease fittings 126 include one-quarter inch, three-sixteenth inch, one-eighth inch, 6 mm, 8 mm, 10 mm, or any other diameters available. In at least one embodiment of the present invention, cupped end 122 is designed with flexible prongs that can grip any size or shape grease fitting.

Shaft second end 118 is removably connected to stem 142. Shaft second end 118 extends from housing drive end 106 into loosening device 130.

Loosening device 130 includes packed coupling 132, stem housing 134, and stem drive system 140. Packed coupling 132 of loosening device 130 is removably coupled to housing drive end 106.

Packed coupling 132 can be removably coupled to housing drive end 106 by any means that provide a pressure tight connection, while being capable of being removed with minimal effort. Exemplary connections include threaded fasteners, clips, clamps, flanged and bolted connection, or other connection means known to one of skill in the art. In at least one embodiment of the present invention, packed coupling 132 is removably coupled to housing drive end 106 using threaded fasteners. Packed coupling 132 includes packing. The packing can be any type of packing capable of creating a seal around shaft body 114, maintaining the predetermined housing pressure in housing 100, and allowing shaft 112 to move through. Packed coupling 132 seals housing drive end 106 from exposure to the atmosphere when loosening device is connected to housing 100. In at least one embodiment of the present invention, the packing is a graphite packing.

Stem housing 134 is attached to packed coupling 132. In one embodiment of the present invention, stem housing 134 and packed coupling 132 are flanged. Stem housing 134 provides rigidity for stem drive system 140. Stem housing 134 includes longitudinal axis 136. Stem housing 134 guides stem 142 along longitudinal axis 136. Stem housing 134 is open such that any section of shaft 112 extending into stem housing 134 is visible, including shaft second end 118. In an alternate embodiment of the present invention, stem housing 134 includes rod 138 running parallel to shaft 112. Rod 138 includes a plurality of position markers 148. Position markers 148 are movable, such that position marker 148 can be moved to mark a location and will remain at the location until moved. Position markers 148 are moveable along rod 138 to any position where shaft second end 118 can be located.

Stem drive system 140 is connected to and extends within stem housing 134. Stem drive system 140 is configured to retract and extend shaft 112 along housing longitudinal axis 102 and longitudinal axis 136 of stem housing 134. Stem drive system 140 includes stem 142, threaded mount 144, and actuator 146.

Stem 142 is connected to shaft second end 118. Stem 142 can be connected to shaft second end 118 by a threaded connection, a welded connection, a flanged connection, with compression fittings, or any other connection means known to one of skill in the art. In one embodiment of the present invention, stem 142 is removably connected to shaft second end 118. The connection point of stem 142 and shaft second end 118 is visible within stem housing 134. In a preferred embodiment of the present invention, stem 142 is threaded. In an alternate embodiment, stem 142 is in the absence of threads. In an alternate embodiment of the present invention, the connection point of stem 142 and shaft second end 118 of shaft 112 is within housing 100.

Stem 142 passes through threaded mount 144. Threaded mount 144 is mounted to stem housing 134. In at least one embodiment of the present invention, threaded mount 144 includes an annulus with the internal surface threaded. Stem 142 passes through the annulus. Threaded mount 144 provides structure for stem drive system 140.

Actuator 146 is connected to threaded mount 144. Actuator 146 operates to move stem 142 through threaded mount 144. Actuator 146 may be any type of actuator capable of engaging stem 142. Engage, engaged, or engaging are meant to be interchangeable in meaning with move, moved, or moving and with reference to stem 142 mean that stem 142 retracts or extends along a longitudinal axis. As used herein, retract means stem 142 moves away from housing drive end 106 and extend means stem 142 moves toward housing anchor end 104. In an embodiment of the present invention, actuator 146 is a wheel. Turning the wheel in one direction retracts stem 142 and turning the wheel in the other direction extends stem 142. In one embodiment of the present invention, the wheel is mounted to the end of stem 142. In an alternate embodiment of the present invention, stem 142 passes through an opening in the center of the wheel. In some embodiments of the present invention, actuator 146 is a chain and pulley system. In some embodiments of the present invention, actuator 146 is operated by electromechanical, pneumatic, or hydraulic control system. In an alternate embodiment, actuator 146 is engaged by a computer-control.

Figure 3:
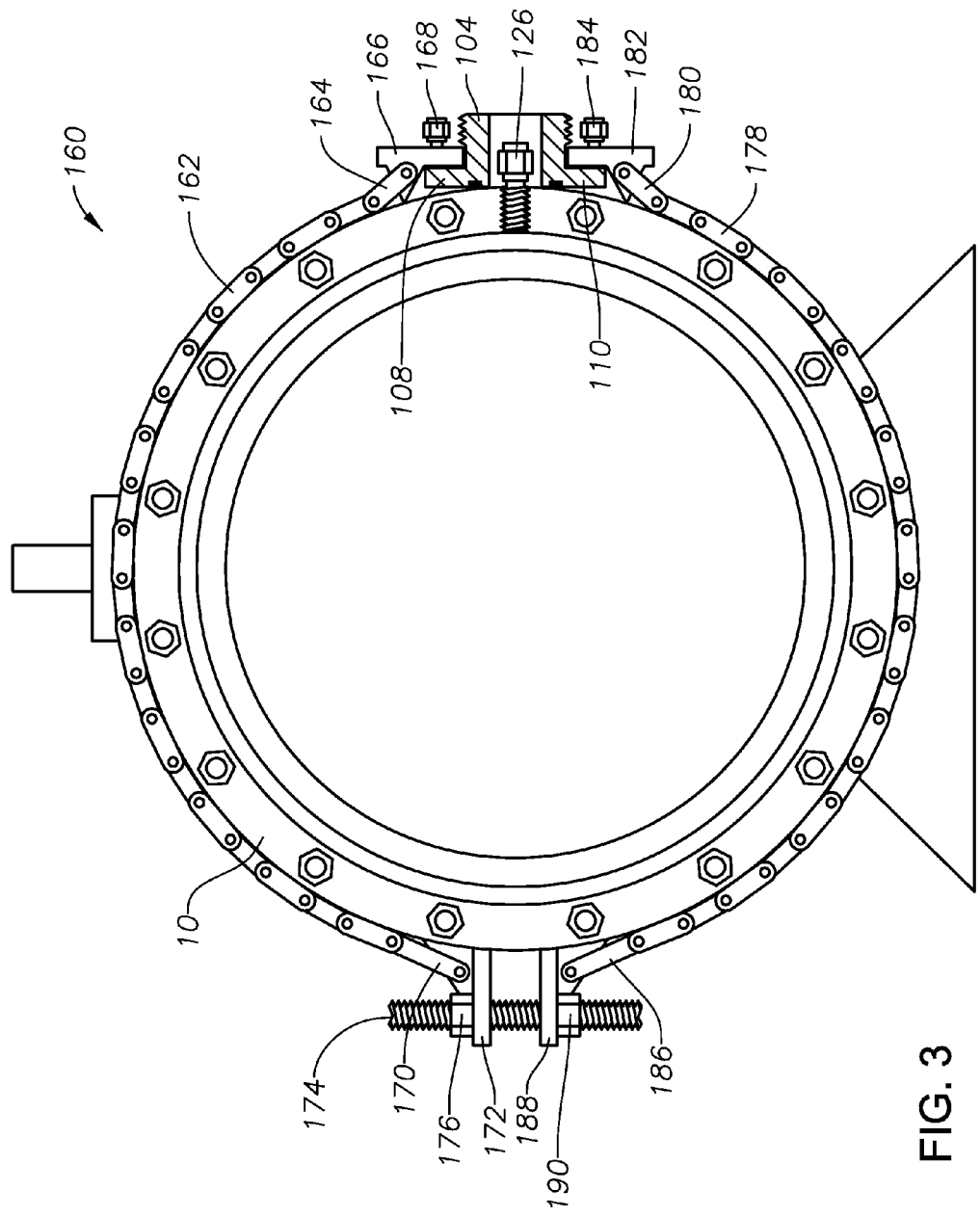
FIG. 3 is a plan view of the temporary mounting system is provided.

Referring to FIG. 3, a plan view of temporary mounting system 160 is provided. Grease fitting replacement tool 1 is secured to piece of equipment 10 with temporary mounting system 160. Temporary mounting system 160 can be any type of mounting that provides a seal between housing anchor end 104 and piece of equipment 10. In at least one embodiment of the present invention, temporary mounting system 160 provides the means to clamp housing 100 to piece of equipment 10.

In accordance with one embodiment of the present invention, temporary mounting system 160 includes top chain 162 and bottom chain 178. One of skill in the art will appreciate that temporary mounting system 160 can include one, two, three, four, or more top chains 162 and bottom chains 178. In at least one embodiment of the present invention, temporary mounting system 160 includes two top chains 162 and two bottom chains 178.

Housing anchor end 104 is placed flush with piece of equipment 10 such that grease fitting 126 is inside of housing 100. In some embodiments of the present invention, top chain 162 includes top anchor end 164 on an end of top chain 162 and top clasp end 170 on the other end of top chain 162. Top anchor end 164 includes top anchor mount 166 and top anchor bolt 168. Top anchor mount 166 is fixed to top anchor end 164. Top anchor end 164 is secured to top 108 at housing anchor end 104 with top anchor mount 166 and top anchor bolt 168. Top anchor mount 166 and top anchor bolt 168 can be any type of connection system. In one embodiment of the present invention, top anchor bolt 168 is a threaded screw which passes through a hole in top anchor mount 166 and screws securely into a position on top 108 at housing anchor end 104.

In some embodiments of the present invention, bottom chain 178 includes bottom anchor end 180 on an end of bottom chain 178 and bottom clasp end 186 on the other end of bottom chain 178. Bottom anchor end 180 includes a bottom anchor mount 182 and bottom anchor bolt 184. Bottom anchor mount 182 is fixed to bottom anchor end 180. Bottom anchor end 180 is secured to bottom 110 at housing anchor end 104 with bottom anchor mount 182 and bottom anchor bolt 184. Bottom anchor mount 182 and bottom anchor bolt 184 can be any type of connection system. In one embodiment of the present invention, bottom anchor bolt 184 is a threaded screw which passes through a hole in bottom anchor mount 182 and screws securely into a position on bottom 110 at housing anchor end 104.

Top chain 162 lies on a top of piece of equipment 10 such that top clasp end 170 is on the other side of piece of equipment 10 from top anchor end 164. Top clasp end 170 includes top clasp mount 172, clasp bolt 174, and top clasp nut 176. Top clasp end 170 is fixed to top clasp mount 172. In a preferred embodiment of the present invention, clasp bolt 174 is threaded. Bottom chain 178 is passed underneath piece of equipment 10 such that bottom clasp end 186 is on the other side of piece of equipment 10 from bottom anchor end 180. Bottom clasp end 186 includes bottom clasp mount 188 and bottom clasp nut 190. Bottom clasp end 186 is fixed to bottom clasp mount 188.

To secure grease fitting replacement tool 1 to piece of equipment 10, clasp bolt 174 is passed through a hole (not shown) in top clasp mount 172 and through a hole in bottom clasp mount 188. Top clasp nut 176 is tightened by screwing top clasp nut 176 along clasp bolt 174 extending above top clasp mount 172 until clasp bolt 174 touches top clasp mount 172. Bottom clasp nut 190 is tightened by screwing bottom clasp nut 190 along clasp bolt 174 extending down from bottom clasp mount 188 until bottom clasp nut 190 touches bottom clasp mount 188. As top clasp nut 176 and bottom clasp nut 190 are tightened, top clasp mount 172 and bottom clasp mount 188 are brought closer together. Top clasp mount 172 and bottom clasp mount 188 are brought closer together until top chain 162 and bottom chain 178 are secure around piece of equipment 10. Top chain 162 and bottom chain 178 are secure when there is a tight seal between housing anchor end 104 of housing 100 and piece of equipment 10. One of skill in the art will appreciate that references to up or down, top or underneath are relative to the orientation of grease fitting replacement tool 1 except where indicated otherwise. One of skill in the art will appreciate that each chain will have the additional components of temporary mounting system 160 as described above. By way of example, when two top chains 162 are used each chain will have a top anchor mount 166 for a total of two top anchor mounts 166.

In at least one embodiment of the present invention, top chain 162 and bottom chain 178 are one chain (not shown) having two ends. In at least one embodiment of the present invention, the one chain includes an anchor mount and anchor bolt on each end of the chain. The anchor bolts secure the one chain to housing anchor end 104 using the anchor mounts, with the chain wrapped around piece of equipment 10. In at least one embodiment of the present invention, there is one fitting plate through which housing anchor end 104 passes before lying flush with piece of equipment 10. In at least one embodiment of the present invention, the one chain has threaded anchor bolts affixed permanently to the ends of the chain, which pass through the fitting plate and secured to the fitting plate using fasteners configured to tighten along the anchor bolts.

In some embodiments of the present invention, housing anchor end 104 includes a seal (not shown). The seal prevents leaks from grease fitting replacement tool 1, at the point where grease fitting replacement tool 1 meets piece of equipment 10. The seal can be a mechanical seal, such as a gasket. In a preferred embodiment, the seal is an O-ring. The O-ring can be of any material, size, and shape that provides a seal between housing anchor end 104 and piece of equipment 10.

Figure 4:
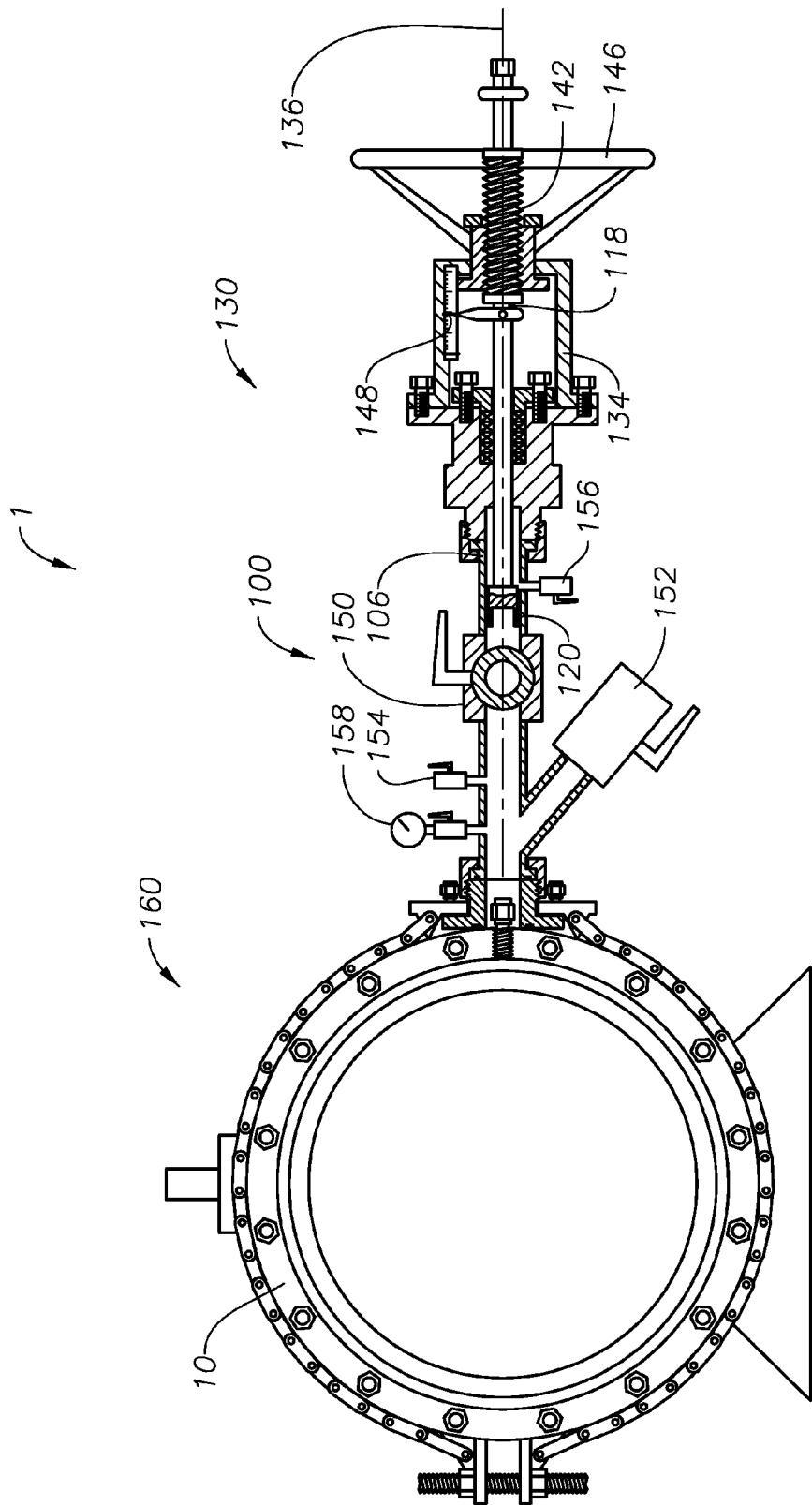
FIG. 4 is a plan view of grease fitting replacement tool 1 in a retracted position.

Referring to FIG. 4, a view of grease fitting replacement tool 1 in a retracted position is provided. After securing grease fitting replacement tool 1 to piece of equipment 10 with temporary mounting system 160 as described with reference to FIG. 3, grease fitting replacement tool 1 is ready for use. In some embodiments of the present invention, actuator 146 is engaged to retract stem 142 along longitudinal axis 136 of stem housing 134 and through stem housing 134 away from housing drive end 106. Retracting stem 142 retracts adaptive socket 120 toward housing drive end 106. The retracted position is achieved when adaptive socket 120 is located between main valve 150 and housing drive end 106. The connection point of stem 142 and shaft second end 118 is observable. In one embodiment of the present invention, the location of the connection point of stem 142 and shaft second end 118 is marked with position marker 148 when in the retracted position.

When grease fitting replacement tool 1 is in the retracted position, main valve 150, and vent valve 156 are closed. In some embodiments of the present invention, vent valve 156 is closed prior to placing grease fitting replacement tool 1 in the retracted position. In embodiments of the present invention where fall-out trap 152 is a valve, the valve can be closed after grease fitting replacement tool 1 is placed in the retracted position or before.

Closing main valve 150 isolates housing anchor end 104 from housing drive end 106. Pressure port valve 154 is opened. The pressurizing medium is introduced to housing 100 through pressure port valve 154. In at least one embodiment of the present invention, the pressurizing medium is hydraulic oil. Pressure gauge 158 displays the pressure within housing 100 at housing anchor end 104. The pressurizing medium pressurizes housing 100 to the predetermined housing pressure. When housing anchor end 104 reaches the predetermined housing pressure, main valve 150 is opened. In some embodiments of the present invention, the predetermined housing pressure is maintained in housing anchor end 104 for a period of time prior to opening main valve 150. In at least one embodiment, the predetermined housing pressure is maintained for a period of 10 minutes. Maintaining the predetermined housing pressure allows one to ensure there are no leaks in the housing. After opening main valve 150, the predetermined housing pressure is maintained in housing 100. In at least one embodiment of the present invention, main valve 150 remains open during the period while pressurizing housing 100 to the predetermined housing pressure.

In an alternate embodiment of the present invention, loosening device 130 is separated from housing 100 prior to the step of securing housing 100 to piece of equipment 10. Housing 100 is secured on piece of equipment 10 in the absence of loosening device 130 and the step of pressurizing housing anchor end 10 to the predetermined housing pressure proceeds as described herein. After reaching the predetermined housing pressure in housing anchor end 104, loosening device 130 is attached to housing drive end 106. Attaching loosening device 130 isolates housing drive end 106 from the atmosphere. Main valve 150 is opened. The predetermined housing pressure is maintained in housing 100.

Figure 5:
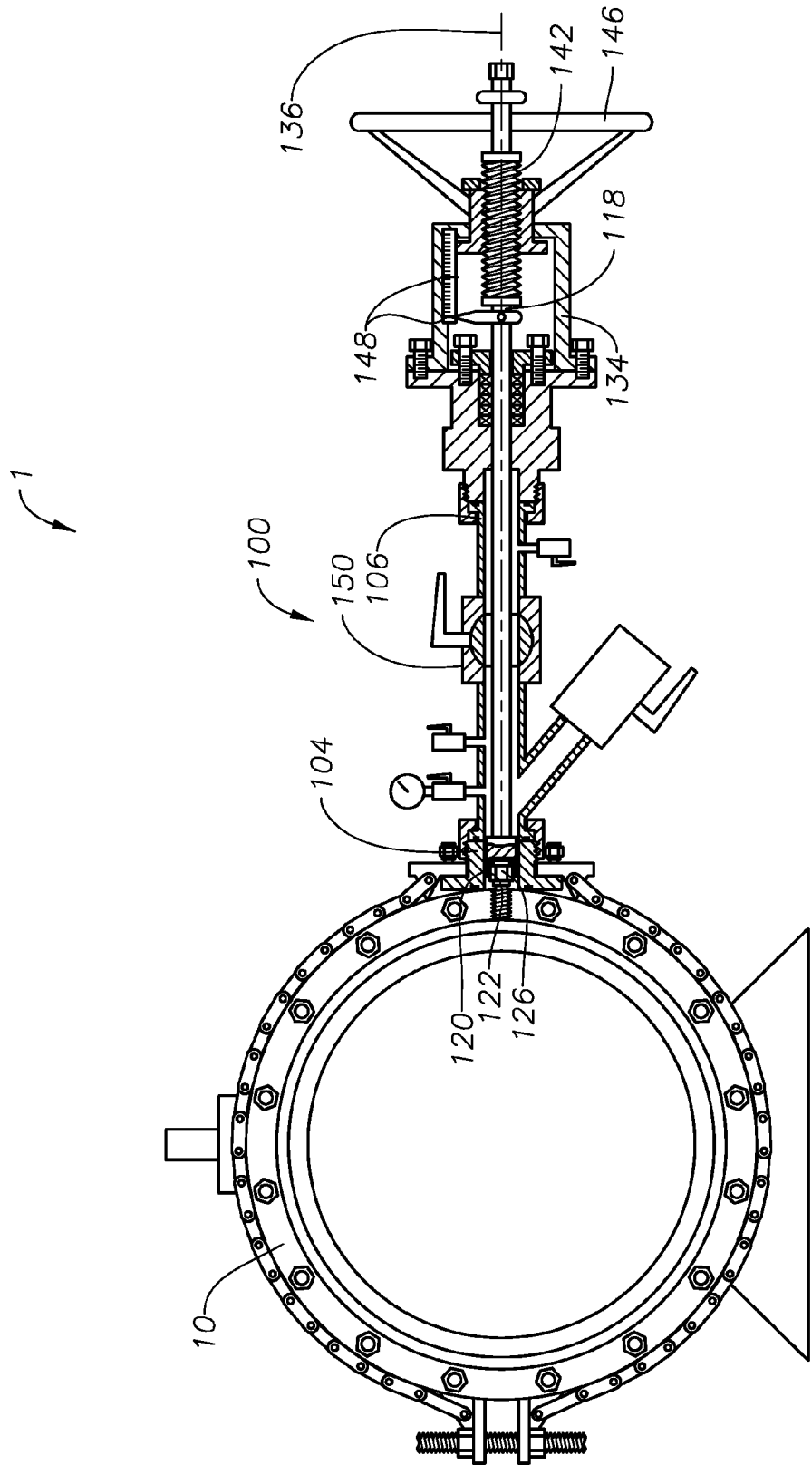
FIG. 5 is a plan view of a grease fitting replacement tool 1 in an extended position.

Referring to FIG. 5, a view of grease fitting replacement tool 1 in an extended position is provided. Placing the grease fitting replacement tool 1 in an extended position occurs after the predetermined pressure is reached in housing 100. Actuator 146 is engaged to extend stem 142 along longitudinal axis 136 of stem housing 134 and through stem housing 134 toward from housing drive end 106. Extending stem 142 extends adaptive socket 120 toward housing anchor end 104. The extended position is when adaptive socket 120 is proximate to housing anchor end 104, between housing anchor end 104 and main valve 150. The connection point of stem 142 and shaft second end 118 is observable. In one embodiment of the present invention, the location of the connection of stem 142 and shaft second end 118 in the extended position is marked with a position marker 148, preferably a position marker that is not already marking a retracted position.

Cupped end 122 of adaptive socket 120 grips grease fitting 126. Actuator 146 is engaged to remove grease fitting 126. In some embodiments, actuator 146 is engaged in the same direction which extends stem 142. In some embodiments, actuator 146 is engaged in the same direction which retracts stem 142. In some embodiments, grease fitting 126 is a screw and actuator 146 is engaged to unscrew grease fitting 126.

With grease fitting 126 gripped by cupped end 122, actuator 146 is engaged to place grease fitting replacement tool 1 in the retracted position as described with reference to FIG. 4. In some embodiments, position marker 148 marks the location of the retracted position and actuator 146 retracts stem 142 until the connection between stem 142 and shaft second end 118 is at position marker 148 marking the location of the retracted position.

In the retracted position, main valve 150 is closed isolating housing anchor end 104 from drive anchor end 106. Vent valve 156 is opened to depressurize housing drive end 106. Loosening device 130 is disconnected from housing 100. Removing loosening device 130 provides access to adaptive socket 120. Grease fitting 126 is removed from cupped end 122. A new grease fitting 126 is placed in cupped end 122. Loosening device 130 is reattached to housing 100. Vent valve 156 is closed. Main valve 150 is opened. Pressure in housing 100 is returned to the predetermined housing pressure. Actuator 146 is engaged to extend stem 142 to the extended position. New grease fitting 126 is installed in piece of equipment 10 by engaging actuator 146 to install grease fitting 126.

After new grease fitting 126 is installed, the source of pressure is removed from pressure port valve 154 and vent valve 156 is opened to depressurize housing 100. In at least one embodiment of the present invention, vent valve 156 drains the pressurizing medium from housing 100. Temporary mounting system 160 is unsecured and removed from piece of equipment 10 by reversing the steps described herein with reference to securing temporary mounting system 160.

In some embodiments of the present invention, grease fitting 126 is not gripped by cupped end 122 when loosening device 130 is disconnected from housing 100. After new grease fitting 126 is installed in piece of equipment 10, fall-out trap 152 is opened and grease fitting 126 is removed from housing 100 through fall-out trap 152.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A grease fitting replacement tool, the grease fitting replacement tool comprising:
   a housing having a housing longitudinal axis, a housing anchor end, a housing drive end, a top, and a bottom;
   a shaft, the shaft at least partially enclosed within and extending from the housing drive end, wherein the shaft comprises a shaft body, a shaft first end, and a shaft second end, wherein the shaft is configured to move along the housing longitudinal axis;
   an adaptive socket, the adaptive socket comprising a cupped end and a shaft end, wherein the shaft end is removably mounted on the shaft first end, wherein the cupped end is configured to grip a grease fitting;
   a loosening device, the loosening device removably coupled to the housing drive end, wherein the loosening device comprises:
      a packed coupling, the packed coupling connected to the housing drive end, the packed coupling configured to create a seal around the shaft body;
      a stem housing, the stem housing attached to the packed coupling, wherein the stem housing is configured to guide a stem, the stem housing having a longitudinal axis; and
      a stem drive system, the stem drive system mounted to the stem housing, the stem drive system comprising:
         the stem, the stem connected to the shaft second end and at least partially enclosed within and extending from the stem drive system, wherein the stem is configured to move the shaft along the longitudinal axis of the stem housing;
         a threaded mount, the threaded mount connected to the stem housing, wherein the threaded mount is configured to pass the stem along the longitudinal axis of the stem housing; and
         an actuator, the actuator connected to the threaded mount, wherein the actuator is configured to drive the stem along the longitudinal axis of the stem housing;
   a main valve positioned in the housing through which the shaft passes, the main valve configured to achieve a closed position,
      wherein the closed position seals the housing anchor end from the housing drive end;
   a fall-out trap positioned in the housing between the main valve and the housing anchor end, the fall-out trap configured to hold the grease fitting clear of the housing longitudinal axis;
   a pressure port valve positioned in the housing, the pressure port valve configured to allow for pressurizing the housing anchor end to a predetermined housing pressure;
   a vent valve positioned in the housing between the main valve and the housing drive end, the vent valve is configured to relieve the pressure in the housing drive end when the main valve is in the closed position;
   a pressure gauge, the pressure gauge configured to display the predetermined housing pressure in the housing; and
   a temporary mounting system configured to temporarily secure the grease fitting replacement tool to a piece of equipment, such that the housing anchor end is flush with the piece of equipment.

2. The grease fitting replacement tool of claim 1, wherein the stem housing further comprises a plurality of position markers, the position markers configured to mark positions along the longitudinal axis of stem housing.

3. The grease fitting replacement tool of claim 1, wherein the temporary mounting system comprises:
   a top chain, the top chain comprising a top anchor end and a top clasp end,
      wherein the top anchor end is configured to secure the top chain to the top of the housing at the housing anchor end, wherein the top anchor end comprises a top anchor mount and a top anchor bolt,
wherein the top anchor bolt secures the top anchor mount to the top of the housing at the housing anchor end,
wherein the top clasp end is configured to secure the top clasp end of the top chain to a bottom clasp end of a bottom chain, wherein the top clasp end comprises a top clasp mount, a clasp bolt, and a top clasp nut,
wherein the clasp bolt fits through the top clasp mount and into a bottom clasp mount of the bottom chain, wherein the top clasp nut and a bottom clasp nut can be tightened on the clasp bolt so that the top clasp mount and the bottom clasp mount are brought together; and
the bottom chain, the bottom chain comprising a bottom anchor end and the bottom clasp end,
wherein the bottom anchor end is configured to secure the bottom chain to the bottom of the housing anchor end, wherein the bottom anchor end comprises a bottom anchor mount and a bottom anchor bolt,
wherein the bottom anchor bolt secures the bottom anchor mount to the bottom of the housing anchor end.

4. The grease fitting replacement tool of claim 1, wherein the actuator is a wheel.

5. The grease fitting replacement tool of claim 1, wherein the pressure gauge is positioned between the housing anchor end and the main valve.

6. The grease fitting replacement tool of claim 1, wherein the piece of equipment is a motor operated valve.

7. The grease fitting replacement tool of claim 1, wherein the fall-out trap is a valve configured to pass the grease fitting therethrough.

8. A method of using a grease fitting replacement tool to replace a grease fitting of a piece of equipment, the method comprising the steps of:
positioning a housing anchor end of a housing such that an adaptive socket within the housing aligns with the grease fitting of the piece of equipment, wherein the housing comprises a housing longitudinal axis, a housing anchor end, and a housing drive end,
wherein the adaptive socket is removably mounted to a shaft first end of a shaft,
wherein the shaft is configured to move along the housing longitudinal axis,
wherein the housing drive end is connected to a loosening device;
securing the housing to the piece of equipment, wherein the housing is flush with the piece of equipment;
retracting a stem to a retracted position, wherein an actuator retracts the stem connected to a shaft second end, the retracted position being where the adaptive socket removably mounted on the shaft first end is between a main valve and the housing drive end,
wherein the actuator is connected to a threaded mount, the threaded mount configured to pass the stem through the loosening device;
closing the main valve, the main valve being located in the housing, wherein the main valve is configured to seal the housing anchor end from the housing drive end;
closing a vent valve, the vent valve located in the housing between the main valve and the housing drive end;
opening a pressure port valve, wherein the pressure port valve is located in the housing between the housing anchor end and the main valve, wherein the pressure port valve is configured to introduce a pressurizing medium to the housing to pressurize the housing anchor end to a predetermined housing pressure;
opening the main valve;
maintaining the pressure within the housing at the predetermined housing pressure;
extending the stem to an extended position, wherein the actuator extends the stem, the extended position being where the adaptive socket is proximate to the housing anchor end between the housing anchor end and the main valve;
gripping the grease fitting with the cupped end of the adaptive socket;
removing the grease fitting from the piece of equipment;
retracting the stem to the retracted position;
closing the main valve, wherein the step of closing the main valve occurs when the stem is in the retracted position;
opening the vent valve to depressurize the housing drive end;
disconnecting the loosening device from the housing;
removing the grease fitting gripped by the adaptive socket;
placing a new grease fitting in the adaptive socket;
connecting the loosening device to the housing;
closing the vent valve;
opening the main valve;
maintaining the pressure within the housing at the predetermined housing pressure;
extending the stem to the extended position;
installing the new grease fitting;
closing the pressure port valve;
opening the vent valve; and
unsecuring the housing from the piece of equipment.

9. The method of claim 8, wherein the step of securing the housing comprises the steps of:
bolting a top chain to a top of the housing at housing anchor end;
bolting a bottom chain to a bottom of the housing anchor end;
wrapping the top chain around a top of the piece of equipment;
wrapping the bottom chain around a bottom of the piece of equipment; and
securing the bottom chain to the top chain with a clasp bolt, wherein the clasp bolt passes through a bottom clasp mount and a top clasp mount and is secured with a bottom clasp nut and a top clasp nut, wherein the clasp bolt, the bottom clasp nut and the top clasp nut are configured to bring the top chain and the bottom chain together such that the housing anchor end is flush with the piece of equipment.

10. The method of claim 8 further comprising the steps of:
marking the retracted position with a first position marker on the loosening device; and
marking an extended position with a second position marker on the loosening device.

11. The method of claim 8, wherein the step of closing the vent valve is performed prior to the step of securing the housing to a piece of equipment.

12. The method of claim 8, wherein the housing further comprises a fall-out trap, the fall-out trap located on the bottom of the housing between the housing anchor end and the main valve.

13. The method of claim 8, wherein the step of closing a fall-out trap is performed prior to the step of securing the housing to a piece of equipment.

* * * * *